Oct. 8, 1957 M. M. DICKEY 2,808,949
WAGON BODY WITH ENDLESS CONVEYER UNLOADING MECHANISM
Filed Dec. 22, 1954 3 Sheets-Sheet 1
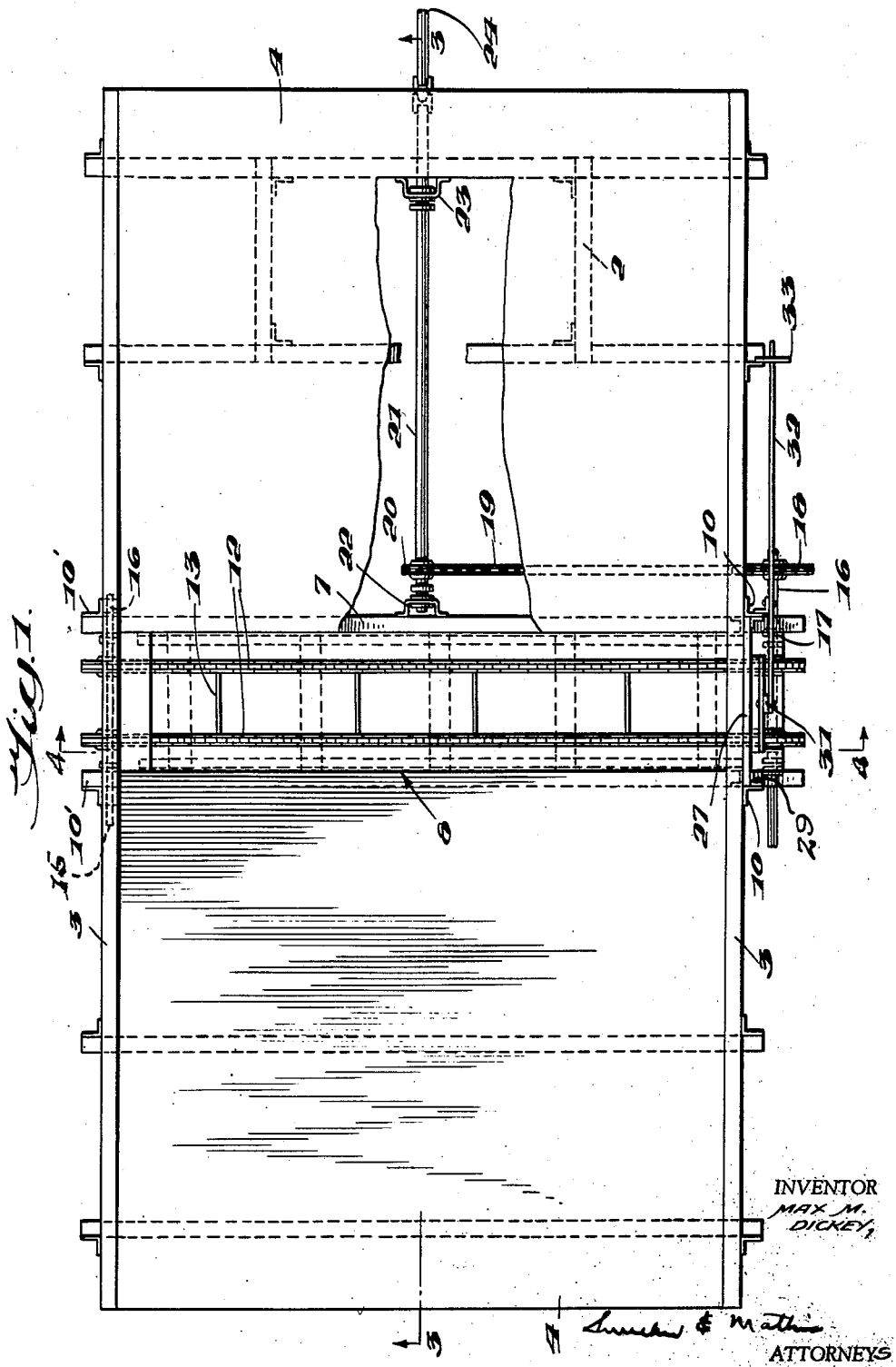
INVENTOR
MAX M. DICKEY,
ATTORNEYS

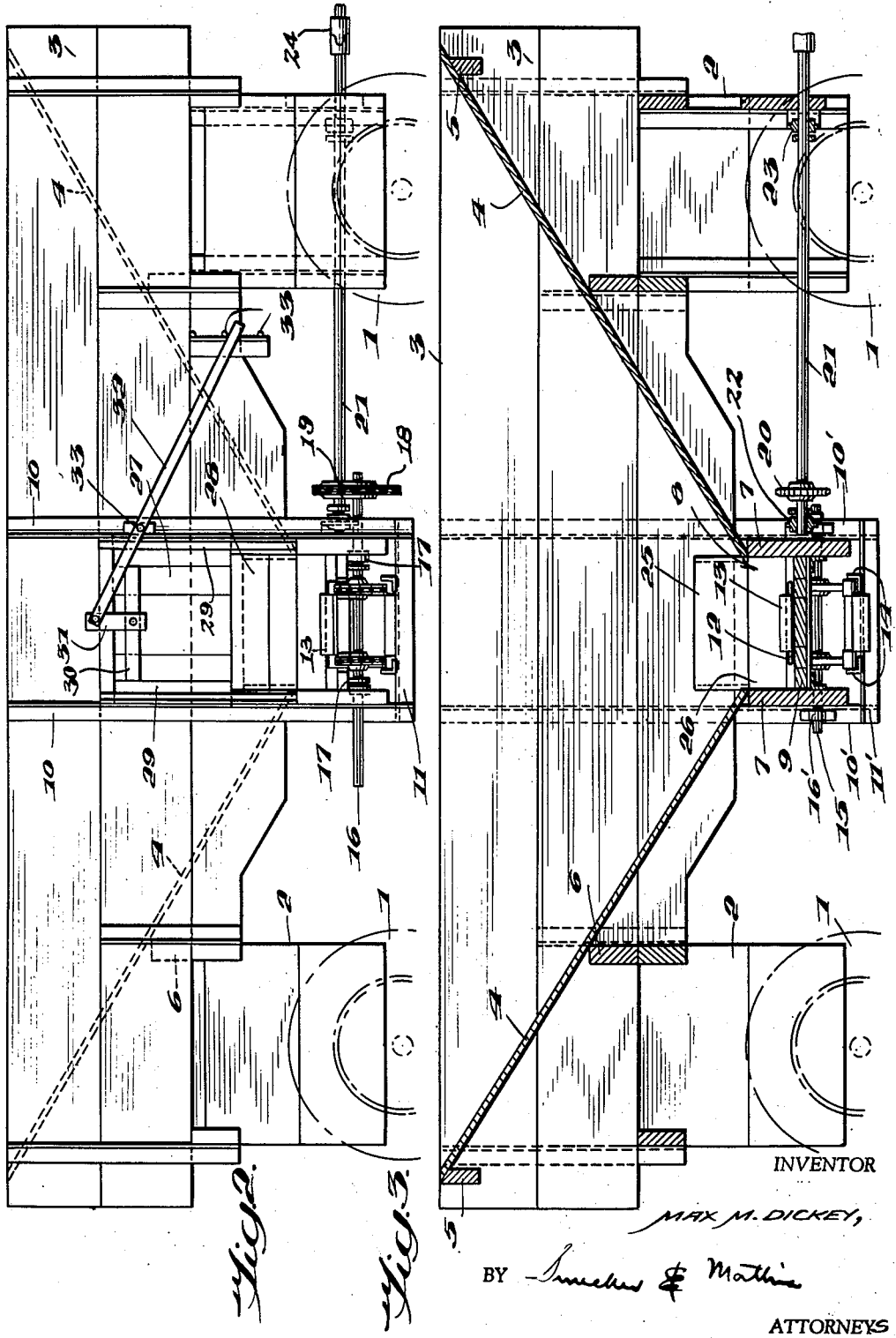

Oct. 8, 1957   M. M. DICKEY   2,808,949
WAGON BODY WITH ENDLESS CONVEYER UNLOADING MECHANISM
Filed Dec. 22, 1954   3 Sheets-Sheet 3

INVENTOR
MAX M. DICKEY,

BY

ATTORNEYS

United States Patent Office 2,808,949
Patented Oct. 8, 1957

2,808,949

WAGON BODY WITH ENDLESS CONVEYER UNLOADING MECHANISM

Max M. Dickey, Rushville, Ind.

Application December 22, 1954, Serial No. 477,059

6 Claims. (Cl. 214—83.36)

This invention relates to improvements in wagon bodies, and more particularly to devices for unloading lading from wagon bodies and other suitable conveyances.

It has been customary heretofore to provide flat bed wagon bodies for hauling ear corn, small grain and feed, from the field to a point of discharge. For example, where ear corn is hauled from the picker, it is desirable that it be dumped into the hopper of an elevator for conveyance to a storage bin. The same is often true in hauling other small grain either from a combine or from a sheller to any desired point of storage.

Where a flat bed wagon is used for this purpose, as has been the general practice heretofore, it is often necessary that the wagon be upended bodily for flow of the grain out of an end thereof into the hopper of an elevator, by gravity. This not only is cumbersome and inconvenient, but it also requires a lifting device for the wagon and is very time-consuming, due to the slowness with which the grain flows by gravity out of the wagon bed.

Attempts have been made heretofore to provide mechanical devices for positively unloading the grain from the wagon bed, but these have not been satisfactory to an extent that they have been practical for adoption generally. Consequently, they have not gone into any extensive commercial production.

One object of this invention is to improve the construction of wagon beds to provide for the removal of the grain therefrom by power in a minimum of time and with very little effort on the part of the operator.

Another object of the invention is to overcome the objections to unloading devices proposed heretofore and to facilitate the unloading of grain from the wagon bed by a simple and inexpensive construction provided on the bed that will not add appreciably to the cost thereof and yet will facilitate the unloading action.

Still another object of the invention is to provide a transverse endless conveyor in a recessed portion of the wagon bed, to which the grain is directed by gravity by inclined portions of the bottom of the bed, which endless conveyor may be operated by power means, either mounted directly on the wagon, or from the power take-off shaft of a tractor coupled to the wagon. A suitable control can be provided whereby the wagon may be unloaded in a very few minutes, even without the necessity for the operator to leave his seat on the tractor to accomplish this result, and without requiring any additional attendant or workman.

These objects may be accomplished according to one embodiment of the invention by providing a wagon bed with a recessed transversely extending center portion in the bottom thereof, which recessed portion may be in the form of a transverse trough, and having the bottom sections of the wagon bed sloping downwardly thereto for flow of the grain into the trough. An endless conveyor is provided in the bottom of the trough, extending lengthwise thereof to a point outside the wagon, at one side thereof, in position to discharge into the hopper of an elevator when the wagon is drawn up beside the latter for directing the grain or other lading into the elevator. An endless flight conveyor is preferable for this purpose, which may be operated either directly by power means on the wagon or other conveyance, or by a power take-off shaft coupled to the tractor connected with the wagon.

The endless conveyor preferably extends throughout the width of the wagon bed and through one side thereof, projecting from the latter sufficiently to discharge into the hopper of the elevator. Provision should be made at opposite ends of the conveyor for retaining the grain within the wagon bed during transportation to the point of discharge and without interfering with the proper operation of the conveyor when it is desired to discharge the grain therefrom. It is preferred that a sliding door be provided at the discharge side of the wagon bed which may be elevated to vary the quantity of discharge therefrom and the speed with which the material is removed. A deflector plate is provided at the opposite end of the conveyor over the opening that accommodates the last-mentioned end of the conveyor. Flexible flaps are provided both on the sliding door and on the deflector plate, to allow operation of the conveyor and discharge of the grain through one of the openings without interfering with the operation of the conveyor.

This embodiment of the invention is illustrated in the accompanying drawings in which:

Fig. 1 is a top plan view of the wagon showing the invention applied thereto;

Fig. 2 is a side elevation of the wagon bed;

Fig. 3 is a longitudinal section therethrough on the line 3—3 in Fig. 1; and

Figure 4:
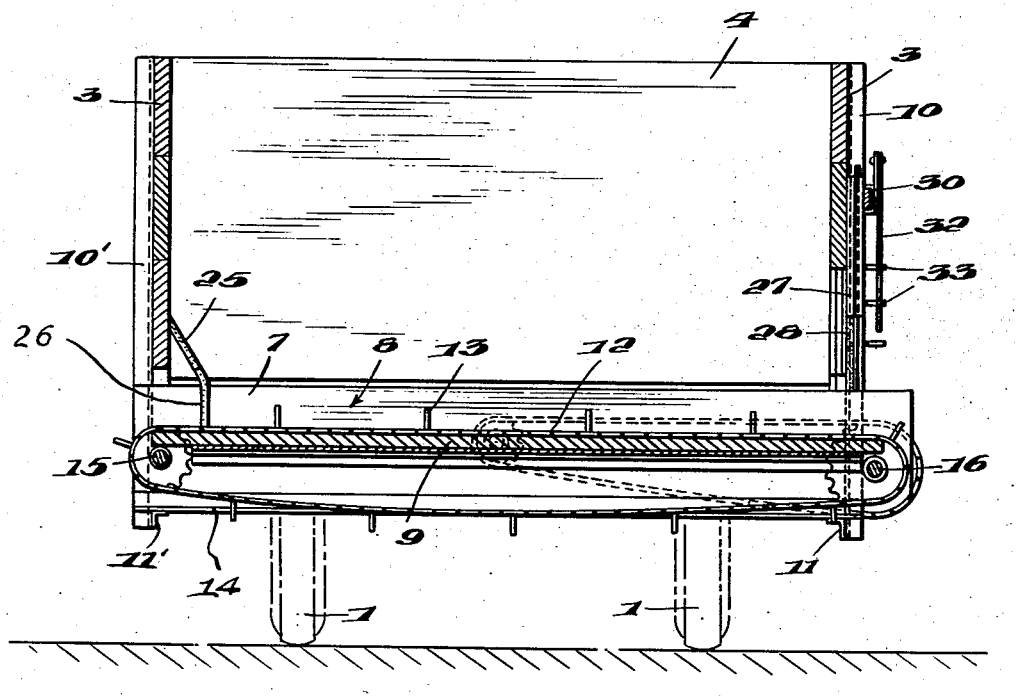
Fig. 4 is a transverse section therethrough on the line 4—4 in Fig. 1.

The invention is shown as applied to a wagon of a conventional form, the wheels of which are illustrated generally at 1 and are shown only in dotted lines in the drawings, as illustrative of a running gear of suitable form. It is recognized, however, that the invention may be applied to any suitable conveyance for lading, although having a special utility for the hauling of grain, corn, feed, etc.

The wagon bed is supported on the running gear by boxing or elevated supports, generally indicated at 2, which may be mounted directly on the running gear frame, as by being seated thereon. The boxing or elevated supports 2 preferably extend throughout the width of the running gear and form sturdy supports for the wagon bed, seating the latter thereon.

The wagon bed proper comprises opposite side walls 3, extending throughout the length of the wagon bed. These side walls 3 may be formed of wooden boards or other suitable material, as desired. Bottom sections are shown at 4, extending transversely between the side walls 3 and are inclined downwardly substantially from the upper edges thereof. These sections 4 may also be formed of wooden boards or other suitable material, and by extending between the side walls 3, close the end sections of the wagon bed throughout the height thereof. The bottom sections 4 may be supported by transverse end supports 5 that extend between the opposite side walls 3, as shown in Fig. 3, and additional supports may be provided at 6, intermediate the length of the bottom sections. The lower ends of the bottom sections 4 are mounted upon and supported by transverse timbers 7, forming the side walls of a trough section extending transversely of the wagon bed beneath the bottom of the side walls thereof. The sides of the trough section extend directly downward from the inner ends of the bottom sections 4 and enclose the opposite sides of a trough which is indicated generally at 8, that extends transversely throughout the width of the wagon bed. The trough 8 is closed at the bottom thereof by a floor 9, which extends transversely between the side members 7.

At each opposite side of the wagon bed and spaced upon opposite sides of the trough 8 are a pair of upright frame members 10, 10'. The frame members 10, 10' are secured by any suitable fastenings to the side walls 3 of the wagon bed, not only to connect together the boards forming the respective side walls but also to brace the latter at the intermediate section thereof. Each pair of frame members 10, 10' is connected together at the lower ends thereof by a connecting bar 11, 11', thus forming a secure supporting frame at the corresponding side of the wagon bed.

An endless flight conveyor extends lengthwise of the depressed trough 8, in the bottom thereof. This flight conveyor comprises a pair of sprocket chains 12, connected together by flight bars 13 that extend transversely from side to side of the flight conveyor between the chains thereof. The upper runs of the chains 12 and the flight bars of said upper runs travel along and are supported by the top surface of the floor 9 of the trough 8. The lower runs of the chains and flight bars are supported on rails 14 that extend lengthwise beneath the trough 8 and are mounted on the transverse bars 11, 11', as illustrated in Figs. 3 and 4.

The sprocket chains 15 are supported at their opposite ends on shafts having sprockets thereon. At one end, the supporting shaft is indicated at 15, at the left in Fig. 4, which shaft 15 is mounted in bearings 16', carried by the upright supporting bars 10' and journaled for freedom of turning movement during operation of the conveyor.

At the opposite end of the trough 8, the endless flight conveyor is supported on a transverse shaft 16, carried by bearings 17, mounted in the sides 7 of the trough 8, and the latter projects through an opening in the bottom of the adjacent side wall 3, as shown in Fig. 4. The shaft 16 has a sprocket wheel 18 thereon, connected by a sprocket chain 19, with a sprocket 20. In the illustrated embodiment of the invention, a drive shaft is shown at 21, mounted preferably in the upright longitudinal medial plane of the wagon bed and having the sprocket 20 fixed thereon. One end of the shaft 21 is journaled in a suitable bearing 22 on the outside of the adjacent side 7 of the trough, while the opposite end of the shaft 21 is journaled in a suitable bearing 23 in the upright boxing 2. Either friction or antifriction bearings may be used for this purpose, as desired. While any suitable drive means may be coupled with the shaft 21 for operating the conveyer, it is preferred that a coupling 24 be provided on the forward end of the shaft 21, which may be connected with the usual power take-off on the tractor that is normally coupled to the wagon. Either a clutch connection may be provided in the shaft 21 or the driving means thereof, or the usual clutch connection of the power take-off on the tractor may be used to control the operation of the shaft and the conveyor connected therewith.

At the entrance end of the conveyor, a deflector plate preferably is used over the opening provided in the adjacent side of the wall 3 of the wagon bed, as indicated at 25 in Fig. 4, and which is shown also in Fig. 3. The deflector plate 25 preferably extends downward from the upright wall 3 in an inclined direction, substantially to the top of the sides 7 of the trough 8. The lower end of the deflector plate 25 preferably carries a flap 26 which should be sufficiently flexible so as not to interfere with the proper operation of the flight conveyor, and which can extend down to the chains 12 and yet yield sufficiently for passage of the flight bars thereon. A relatively thick rubber flap may be used for this purpose and has been found suitable, extending throughout the width and height of the trough 8 above the chains 12 to the lower edge of the deflector plate 25. This allows the flight conveyor to extend through the adjacent wall 3 of the wagon bed and yet closes that opening against the accidental leakage of grain therethrough.

At the opposite side of the wagon bed, it is preferred that an adjustable closure be provided so as to vary the size of the opening through which the grain is discharged. For example, for ear corn, a larger opening is needed than would be required for small grain, shelled corn and feed. Thus, I have provided a slidable door, as indicated generally at 27 in Figs. 2 and 4, which door 27 carries a flap 28 on the lower edge thereof. The flap 28 may be of a material similar to that described in connection with the flap 26, while the door 27 may be made of metal, wood, or other suitable material. Where small grain or feed is being discharged, it is preferred that the flap 28 be lowered substantially to the chains 12, the yieldability thereof permitting passage of the flight bars 13 during operation of the conveyor.

The door 27 is shown as mounted between guides 29, connected with the frame members 10 for vertical sliding movement relative to the adjacent side 3 of the wagon bed. A cross bar 30 on the door 27 has an upright link 31 connected therewith at one end, while the opposite end of the link 31 is connected with one end of a lever 32, these preferably being pivotal connections. The lever 32 is pivotally supported at 33 and extends laterally from the door 27 a sufficient distance for free manipulation thereof. Any suitable stop means may be provided for connection with the lever to hold the latter in a set position, such as, for instance, a series of pins 33, mounted on the wagon bed.

The operation and use of the wagon will be apparent from the foregoing description. The door 27 should be lowered sufficiently to retain the lading in the wagon bed during transportation to the point of dumping, but for ear corn, for example, this does not require that the door be moved to its lowermost position. Nevertheless, the flexibility of the flap 28 will be sufficient to permit the discharge of the lading at the point of dumping.

When this point is reached, ordinarily, it will be sufficient merely to operate the drive shaft 21 so as to impart rectilinear movement to the flight conveyor 12—13. If the door 27 has been closed substantially, it may be necessary to open this somewhat to permit of freedom of discharge of the lading through the trough 8, although, it is repeated, the flexible flap 28 normally will be sufficient to retain the lading when the flight conveyor is not in operation.

As shown in Fig. 4, the flight conveyor projects laterally from one side of the wagon bed sufficiently so that it will discharge directly into a suitable receptacle, such as the hopper of an elevator. Thus, it is possible to drive the wagon up directly beside the hopper, with the trough 8 overlapping the latter, and to discharge the lading directly into the hopper by means of the flight conveyor 12—13. It has been found that corn and other grain, as well as feed, may be discharged very quickly in this manner, with a minimum of labor and external mechanism. At the same time, it does not add a great deal to the cost of the wagon bed, but effects a material improvement in the transportation of such materials.

The body of the wagon bed may be constructed, in part or entirely, of metal or other suitable material, instead of this being formed of wooden boards, boxing, etc., as desired. This includes not only the side walls 3 and bottom sections 4, which may be made of metal plates fabricated to the required shape and character, but also the boxing 2 which may be in the form of a metal frame of sufficiently sturdy construction to hold the wagon bed in the proper position on the running gear.

While the invention has been illustrated and described in certain embodiments, it is recognized that other variations and changes may be made therein without departing from the invention as set forth in the claims.

I claim:

1. A wagon body comprising opposite longitudinal side walls, a trough having upright sides and a bottom and extending transversely between the side walls, bottom portions on opposite sides of the trough and extending downwardly at a continuous slope to the upper edges of the trough sides, an endless flight conveyor extending lengthwise of the trough and having an upper run supported on the trough bottom, said trough bottom being in the lower edge portion of the trough sides, with the top of the conveyor spaced downwardly from the upper edge of the trough, said trough and conveyor extending outwardly from the side walls and discharging spaced from the adjacent side wall, and a flexible flap extending downwardly substantially to the upper run of the flight conveyor adjacent the discharge end thereof.

2. A wagon body comprising opposite side walls, a trough having upright sides and a bottom and extending transversely between the side walls, bottom portions on opposite sides of the trough and extending downwardly to the upper edges of the trough sides, an endless flight conveyor extending lengthwise of the trough and having an upper run supported on the trough bottom, said trough and conveyor extending outwardly from the side walls and discharging spaced from the adjacent side wall, a flexible flap extending downwardly between the trough sides into proximity with the upper run of the flight conveyor, and a door supporting said flaps and movable upwardly relative to the conveyor.

3. A wagon body comprising opposite side walls extending lengthwise thereof, end supports extending transversely between the side walls adjacent the ends and upper edges thereof, bottom sections mounted on the end supports and extending downwardly in opposite inclined directions from the end supports substantially to the lower edges of the side walls, trough sides arranged in upright positions at the inner edges of the bottom sections and extending transversely of one of the side walls and outwardly through said wall a substantial distance, a trough bottom extending lengthwise between the trough sides adjacent the lower edges thereof, said last-mentioned wall having a notch therein over the trough, a door mounted on said wall for substantially closing said notch, a flexible flap on the lower edge of the door and extending downwardly therefrom between the opposite sides of the trough, and an endless flight conveyor extending lengthwise of the trough with an upper run movable over the trough bottom and outwardly beyond the last-mentioned side wall.

4. A wagon body comprising longitudinal side walls, a trough extending transversely of the side walls adjacent the bottom thereof, said trough including upright sides extending transversely from one side wall beyond and outwardly from the opposite side wall and having a trough bottom extending between said upright sides substantially to the last-mentioned end thereof, inclined bottom walls betweeen the side walls and extending downwardly and inwardly from the outer ends of the side walls adjacent the top thereof to the upper edges of the trough sides for flow of material over said bottom walls by gravity into the trough, and an endless flight conveyor extending over the trough bottom, said trough bottom being spaced downwardly from the upper edge of the trough an appreciably greater distance than the height of the flight conveyor thereover, whereby a trough of substantial height is provided entirely above the flight conveyor and below the inclined bottom walls.

5. A wagon body comprising longitudinal side walls, a trough extending transversely of the side walls adjacent the bottom thereof, said trough including upright sides extending transversely from one side wall beyond and outwardly from the opposite side wall and having a trough bottom extending between said upright sides substantially to the last-mentioned end thereof, inclined bottom walls between the side walls and extending downwardly and inwardly from the outer ends of the side walls adjacent the top thereof to the upper edges of the trough sides for flow of material over said bottom walls by gravity into the trough, an endless flight conveyor extending over the trough bottom, said trough bottom being spaced downwardly from the upper edge of the trough an appreciably greater distance than the height of the flight conveyor thereover, whereby a trough of substantial height is provided entirely above the flight conveyor and below the inclined bottom walls, and a door slidably mounted on one of the side walls over the trough for raising and lowering movements relative thereto at the discharge end of the conveyor.

6. A wagon body comprising longitudinal side walls, a trough extending transversely of the side walls adjacent the bottom thereof, said trough including upright sides extending transversely from one side wall beyond and outwardly from the opposite side wall and having a trough bottom extending between said upright sides substantially to the last-mentioned end thereof, inclined bottom walls between the side walls and extending downwardly and inwardly from the outer ends of the side walls adjacent the top thereof to the upper edges of the trough sides for flow of material over said bottom walls by gravity into the trough, an endless flight conveyor extending over the trough bottom, said trough bottom being spaced downwardly from the upper edge of the trough an appreciably greater distance than the height of the flight conveyor thereover, whereby a trough of substantial height is provideed entirely above the flight conveyor and below the inclined bottom walls, a door slidably mounted on one of the side walls over the trough for raising and lowering movements relative thereto, and a flexible flap on the lower edge of the door and extending downwardly therefrom in the trough when the door is lowered.

References Cited in the file of this patent

UNITED STATES PATENTS

| | | |
|---|---|---|
| 1,078,068 | Sigismund | Nov. 11, 1913 |
| 1,515,328 | Barkmann et al. | Nov. 11, 1924 |
| 1,928,859 | Kutscha | Oct. 3, 1933 |
| 2,166,135 | Fletcher | July 18, 1939 |
| 2,475,590 | Carbert | July 12, 1949 |
| 2,478,583 | Hybbert | Aug. 9, 1949 |
| 2,495,907 | Reinking | Jan. 31, 1950 |
| 2,496,463 | Gaddis | Feb. 7, 1950 |
| 2,591,556 | Knutson | Apr. 1, 1952 |
| 2,682,959 | Regier | July 6, 1954 |